United States Patent
Kumar et al.

(10) Patent No.: US 10,440,000 B2
(45) Date of Patent: Oct. 8, 2019

(54) SECURE DATA PROVISIONING

(71) Applicant: CRYPTOGRAPHY RESEARCH, INC., Sunnyvale, CA (US)

(72) Inventors: Ambuj Kumar, Sunnyvale, CA (US); Daniel Beitel, San Francisco, CA (US); Benjamin Che-Ming Jun, Burlingame, CA (US)

(73) Assignee: Cryptography Research, Inc., Sunnyvale, CA (US)

( * ) Notice: Subject to any disclaimer, the term of this patent is extended or adjusted under 35 U.S.C. 154(b) by 0 days.

(21) Appl. No.: 15/322,707

(22) PCT Filed: Jul. 9, 2015

(86) PCT No.: PCT/US2015/039804
§ 371 (c)(1),
(2) Date: Dec. 28, 2016

(87) PCT Pub. No.: WO2016/007785
PCT Pub. Date: Jan. 14, 2016

(65) Prior Publication Data
US 2017/0142083 A1  May 18, 2017

Related U.S. Application Data

(60) Provisional application No. 62/023,815, filed on Jul. 11, 2014.

(51) Int. Cl.
*H04L 9/00* (2006.01)
*H04L 29/06* (2006.01)
(Continued)

(52) U.S. Cl.
CPC ........ *H04L 63/061* (2013.01); *G06F 12/1408* (2013.01); *G06F 21/575* (2013.01);
(Continued)

(58) Field of Classification Search
CPC ..................................................... H04L 63/061
(Continued)

(56) References Cited

U.S. PATENT DOCUMENTS 7,475,250 B2   1/2009   Aull et al.
8,677,144 B2   3/2014   Haider et al.
(Continued)

OTHER PUBLICATIONS

ISA/US, "International Search Report and the Written Opinion of the International Searching Authority" for International Patent Application No. PCT/US15/39804, dated Oct. 6, 2016, pp. 1-9.
Notification Concerning Transmittal of the International Preliminary Report on Patentability dated Jan. 26, 2017 re: Int'l Appln. No. PCT/US15/039804. 8 Pages.

*Primary Examiner* — Christopher J Brown
(74) *Attorney, Agent, or Firm* — Lowenstein Sandler LLP

(57) ABSTRACT

A first instruction to store an entity identification (ID) in a memory of a device may be received. The entity ID may be stored in the memory in response to receiving the first instruction. Furthermore, a second instruction to store a value based on a key in the memory of the device may be received. A determination may be made as to whether the value based on the key that is to be stored in the memory corresponds to the entity ID that is stored in the memory. The value based on the key may be stored in the memory of the device when the value based on the key corresponds to the entity ID.

17 Claims, 6 Drawing Sheets

(51) Int. Cl.
  *H04L 9/08* (2006.01)
  *H04L 9/32* (2006.01)
  *H04W 12/04* (2009.01)
  *G06F 21/57* (2013.01)
  *G06F 12/14* (2006.01)

(52) U.S. Cl.
  CPC .......... *H04L 9/0894* (2013.01); *H04L 9/3236* (2013.01); *H04L 9/3242* (2013.01); *H04L 63/0435* (2013.01); *H04L 63/0442* (2013.01); *H04W 12/04* (2013.01); *G06F 2212/1052* (2013.01)

(58) Field of Classification Search
  USPC ......................................................... 713/171
  See application file for complete search history.

(56) References Cited

U.S. PATENT DOCUMENTS

| | | | |
|---|---|---|---|
| 8,843,764 B2* | 9/2014 | Hussain | G06F 21/10 713/189 |
| 9,479,332 B2* | 10/2016 | Ballesteros | G06F 12/1408 |
| 2006/0088167 A1 | 4/2006 | Bade et al. | |
| 2010/0150351 A1* | 6/2010 | Sutton, II | H04L 9/0844 380/277 |
| 2014/0068246 A1 | 3/2014 | Hartley et al. | |
| 2014/0164779 A1* | 6/2014 | Hartley | H04L 9/0866 713/176 |
| 2014/0205092 A1 | 7/2014 | Hartley et al. | |
| 2014/0250490 A1 | 9/2014 | Baca et al. | |

* cited by examiner

SECURE DATA PROVISIONING

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
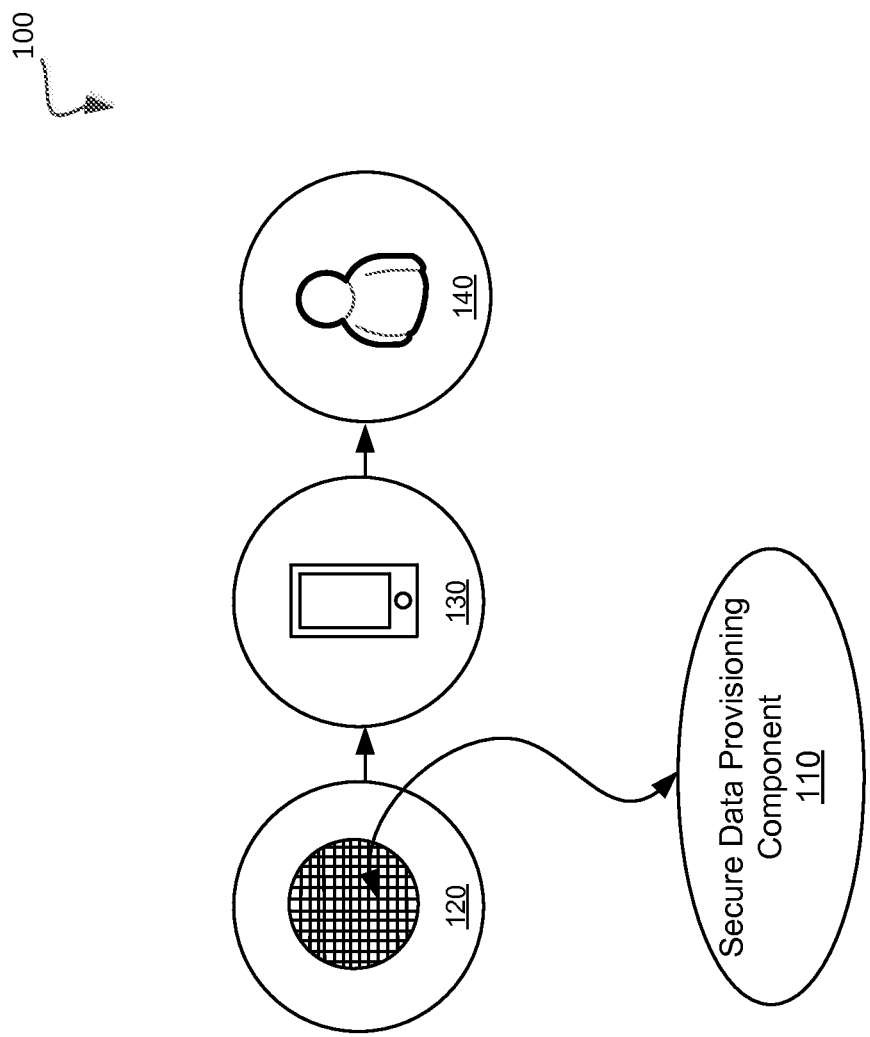
FIG. 1 illustrates an example environment with a device that includes a secure data provisioning component in accordance with some embodiments.

Aspects of the present disclosure are directed to secure data provisioning. For example, data may be stored or provisioned into a memory of a device. The memory may be volatile or non-volatile (e.g., One Time Programmable (OTP), eFuse, Multi-time programmable (MTP), etc.). The data may include a cryptographic key that is to be used during the operation or authentication of the device.

The device may be manufactured in a supply chain environment that includes an Original Equipment Manufacturer (OEM) that designs and provides specifications for the device and an Original Design Manufacturer (ODM) that manufactures or assembles the device based on instructions from the OEM. For example, the device may be an electronics device (e.g., a cellular phone or other such mobile communications device) that is designed by the OEM. The ODM may assemble a system on a chip (SoC) or other electronic component with a memory into the device. A manufacturing facility operated by the ODM may provision or store data into the memory of the device. For example, a cryptographic key may be provisioned or stored into the memory in the device for use in the later operation of the device.

Since the OEM may be in possession of the device after the ODM manufacturers the device, the OEM may seek to provision or store a particular cryptographic key into the memory of the device while the ODM assembles or manufactures the device. The manufacturing facility of the ODM may receive instructions from the OEM over a network. The instructions may be a sequence of instructions for the ODM to store data into the memory of the device as specified by the OEM. However, the manufacturing facility of the ODM may not be secure or trusted by the OEM. For example, the ODM may not provide a secure facility. Since the data may include cryptographic keys that are transmitted from the OEM to the ODM for the ODM to provision into the memory of the device, the security or integrity of the cryptographic keys for the OEM may be compromised. Thus, the later operation of the device that uses the cryptographic key may also be less secure as the ODM that provisions the cryptographic key into the device may not be secure or trusted by the OEM. Accordingly, the OEM may utilize a secure data provisioning component in the device that controls the provisioning or storing of data into the memory of the device.

The secure provisioning of data into the device may ensure that the cryptographic key transmitted by the OEM to the ODM is securely provisioned or stored into the memory of the device being manufactured or assembled by the ODM. The secure data provisioning component may receive instructions from the manufacturing facility of the ODM that are specified by the OEM. For example, a sequence of instructions may be received via a network from the OEM. The first instruction of the sequence of instructions may specify an OEM identification (ID) that is to be provisioned or stored into the memory of the device. Subsequently, a second instruction of the sequence of instructions may be received where the second instruction specifies a hash value of a public key to store in the memory of the device. The secure data provisioning component may verify that the data stored by the previous first instruction corresponds to the data of the second instruction before storing the hash value of the public key in the memory of the device. For example, the secure data provisioning component may provision or store the hash value of the public key in the memory of the device when the public key corresponding to the hash value is identified as corresponding to or matching (e.g., assigned to) the OEM ID that was previously provisioned or stored into the memory of the device. However, if the hash value of the public key is determined to not correspond to the OEM ID that was previously provisioned or stored into the memory of the device, then the hash value of the public key may not be provisioned or stored into the memory of the device.

Furthermore, a third instruction of the sequence of instructions may be received by the secure data provisioning component for provisioning or storing additional data into the memory of the device. The third instruction may specify a cryptographic key (e.g., an OEM key) that is to be provisioned or stored into the memory of the device. In some embodiments, the OEM key may be used to authenticate the device during a later operation of the device. The secure data provisioning component may verify that the data stored in the prior second instruction corresponds to the data of the third instruction before provisioning or storing the data of the third instruction into the memory of the device. For example, the OEM key may be provisioned or stored into the memory of the device when the public key hash value corresponds to the OEM key (e.g., the public key hash value is the expected value when the OEM key is to be provisioned into the memory of the device). Accordingly, at each instruction of the sequence of instructions, the data of the prior instruction that was provisioned into the memory may be verified to match the data of the current instruction.

As previously mentioned, the secure data provisioning may allow for secure provisioning of the cryptographic key specified by the OEM. For example, since the prior data is verified before the provisioning of additional data, the provisioning or storing of the OEM key may be performed when the OEM ID and the public key hash value correspond to the OEM key. Thus, the OEM key may not be provisioned or stored into the memory of the device without the prior OEM ID and public key hash value being from the OEM corresponding to the OEM key. Thus, the OEM key may only be provisioned or stored into the memory of the device if the prior data corresponds to the OEM key. As further described, the secure data provisioning will ensure that the OEM key of a first OEM is not provisioned or stored into the memory of the device that includes an OEM ID and a public key hash value that is associated with a different OEM.

FIG. 1 illustrates an example environment 100 with a device that includes a secure data provisioning component. In general, the environment 100 includes an integrated circuit (IC) manufacturer 120, an Original Design Manufacturer (ODM) 130, and an Original Equipment Manufacturer (OEM) 140 that are associated with the lifecycle of an integrated circuit that includes a secure data provisioning component 110 that is part of a device.

As shown in FIG. 1, the environment 100 includes an IC manufacturer 120 that may fabricate or manufacture an integrated circuit that includes a secure data provisioning component 120. The integrated circuit may include a one-time programmable (OTP) memory. The integrated circuit may be a system on a chip (SoC) that includes an OTP memory, processing logic, the secure data provisioning component 120, and additional memory as described with regard to FIG. 2.

The IC manufacturer 120 may provide the integrated circuit that includes the secure data provisioning component 120 to the ODM 130 that may manufacture a product or a portion of the product that is specified and subsequently used by the OEM 140. For example, the ODM 130 may be another manufacturing entity that controls a manufacturing facility to assemble a device. The OEM 140 may be another entity that uses the product or portion of the product that is manufactured by the ODM 130. For example, the OEM 140 may be in control or possession of the device that includes the secure data provisioning component 110 after the ODM 130 has provided some manufacturing services involving the integrated circuit that includes the secure data provisioning component 110.

The manufacturing facility operated by the ODM 130 may be configured to receive instructions or commands from the OEM 140. For example, the OEM 140 may transmit a sequence of instructions to the manufacturing facility of the ODM 130 via a network. In response to receiving the sequence of instructions from the OEM 140, manufacturing equipment of the ODM 130 may transmit the sequence of instructions to the secure data provisioning component 110 of the device or the portion of a device that is manufactured at the ODM 130. The sequence of instructions may include instructions for storing or provisioning data into a memory of the device or portion of the device that is controlled by the secure data provisioning component 110.

Accordingly, the ODM 130 may be in possession or control of a device or a portion of a device that includes an integrated circuit with a secure data provisioning component 110. The ODM 130 may be configured to transmit instructions to store data into a memory of the integrated circuit based on instructions received from the OEM 140. The secure data provisioning component 110 may ensure that the data stored into the memory of the integrated circuit is authorized or valid as described in further detail with regard to FIGS. 2-5.

Figure 2:
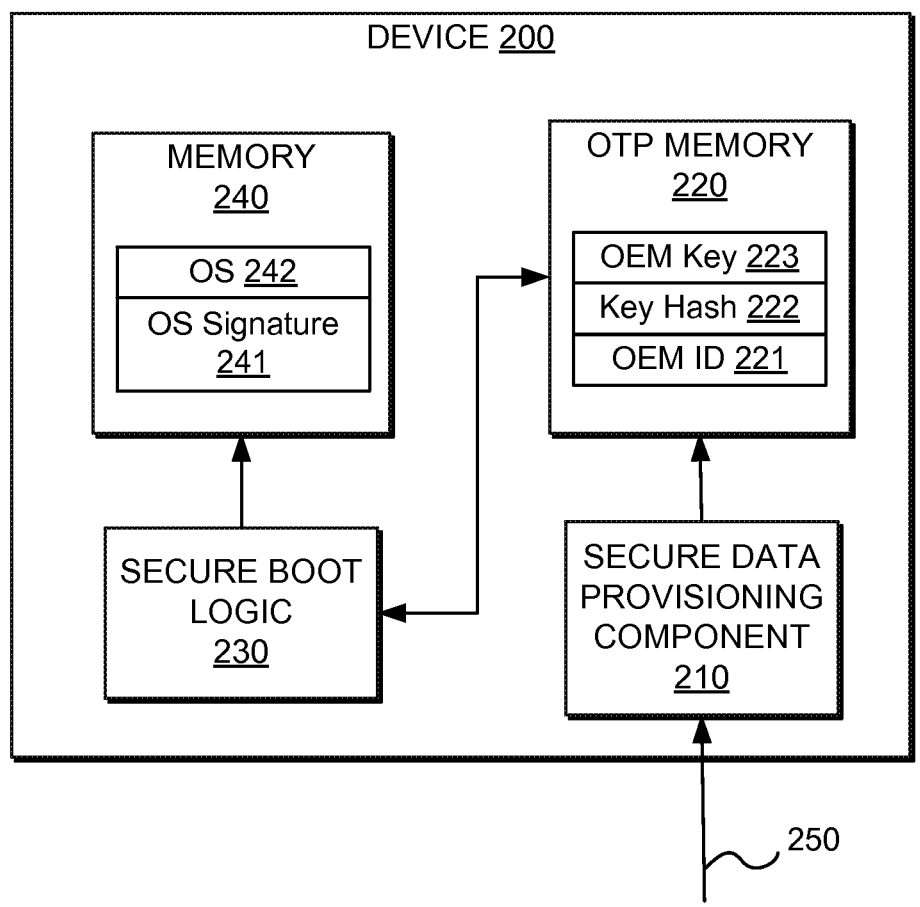
FIG. 2 is a block diagram of an example device with a secure data provisioning component in accordance with some embodiments of the present disclosure.

FIG. 2 is a block diagram of an example device 200 with a secure data provisioning component. In general, the device 200 may include a secure data provisioning component 210 that corresponds to the secure data provisioning component 110 of FIG. 1. In some embodiments, the secure data provisioning component 210 may include processing logic that may comprise hardware (e.g., processing device, circuitry, dedicated logic, programmable logic, microcode, hardware of a device, etc.), software (e.g., instructions run or executed on a processing device), or a combination thereof. The device 200 may be any electronics device.

As shown in FIG. 2, the device 200 may include a secure data provisioning component 210, an OTP memory 220, a secure boot logic 230, and additional memory 240. The secure data provisioning component 210 may receive one or more instructions (e.g., a sequence of instructions) 250 from a manufacturing equipment of an ODM based on a communication from an OEM. The one or more instructions 250 may be instructions to store data into the OTP memory 220. In some embodiments, the OTP memory may refer to a type of digital memory implemented in circuitry or silicon of the device 200 that may be programmed and cannot be changed after being programmed. For example, data (e.g., identification information and/or cryptographic keys) may be programmed into the OTP memory 220 of the device 200 based on the instructions 250 and the data may not be changed in the OTP memory 220 after the programming of the data into the OTP memory 220. Furthermore, the OTP memory 220 may be a type of digital memory where the setting of each bit of the OTP memory 220 is locked by a fuse (e.g., an electrical fuse associated with an initial low resistance and designed to permanently break an electrically conductive path after the programming or setting of a corresponding bit) or an antifuse (e.g., an electrical component associated with an initial high resistance and designed to permanently create an electrically conductive path after the programming or setting of a corresponding bit). As an example, each bit of the OTP memory 220 may start with an initial value of '0' and may be programmed or set to a later value of '1' (or vice versa). Thus, in order to program or provision a cryptographic key with a value of '10001' into the OTP memory 220, two bits of the OTP memory 220 may be programmed from the initial value of '0' to the later value of '1.' Once the two bits of the OTP memory 220 have been programmed to the later value of '1', then the two bits may not be programmed to the value of '0.' As such, the bits of the OTP memory 220 may be programmed once and may not be changed once programmed.

Referring to FIG. 2, the OTP memory 220 may store an OEM ID 221, a key hash 222, and an OEM key 223. In some embodiments, the secure data provisioning component 210 may control or authorize the storing or provisioning of the OEM ID 221, key hash 222, and OEM key 223 into the OTP memory 220.

The device 200 may further include secure boot logic 230 that may execute an operating system (OS) 242 from an additional memory 240 (e.g., a flash memory) based on the key hash 222 in the OTP memory 220. The additional memory 240 may further include an OS signature 241 that is used by the secure boot logic 230 to determine whether or not to execute the OS 242. For example, the secure boot logic 230 may be executed in response to an initiation or power up of the device 200. The secure boot logic 230 may retrieve the key hash 222 from the OTP memory 220, determine a public key associated with the key hash 222 and verify the OS signature 241 by comparing the public key with the OS signature 241 which may correspond to a private key. In some embodiments, the OS 242 or the OS signature 241 may store a copy of the public key and the secure boot logic 230 may calculate a hash value of the copy of the public key and may compare the calculated hash value with the value of the key hash 222. If the calculated hash value matches the value of the key hash 222, then the public key may be considered to be associated with the key hash 222 and may be accessible. Upon verifying the OS signature 241, the OS 242 may be executed and may access the OEM key 223. However, if the key hash 222 is associated with a second OEM while the OEM key 223 is associated with a first OEM, the execution of the OS 242 may result in the accessing of the OEM key 223 of the first OEM based on the key hash 222 of the second OEM. Accordingly, the secure data provisioning described herein may be used to prevent the provisioning or storing of one OEM key into the OTP memory while another OEM's public key hash value is stored into the OTP memory so that the OS 242 that is associated with the other OEM may not be able to access the OEM key.

Figure 3A:
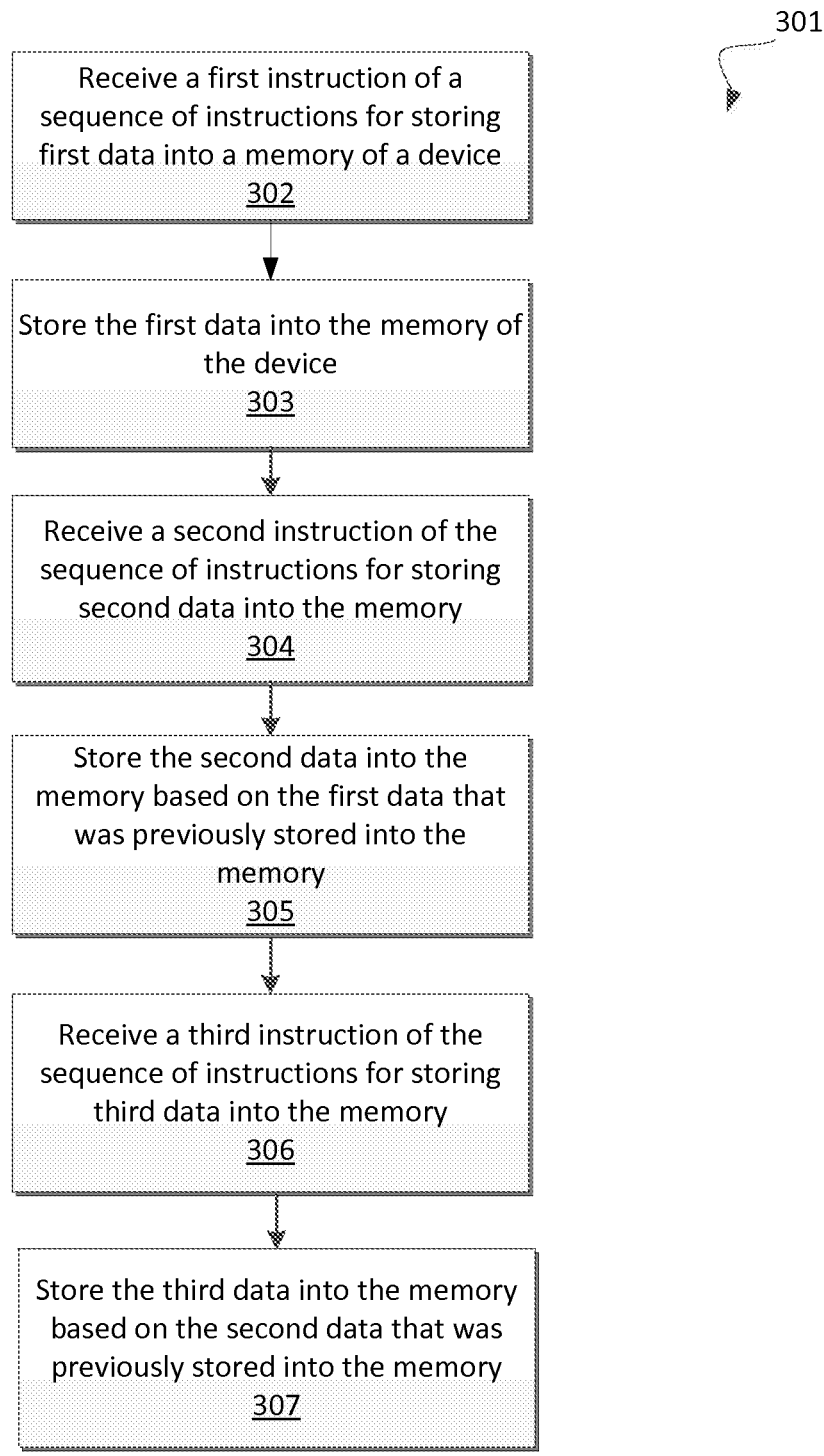
FIG. 3A is a flow diagram of an example method to provision data in a memory in accordance with some embodiments of the present disclosure.

FIG. 3A is a flow diagram of an example method 301 to provision data in a memory. In general, the method 301 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 301 may be performed by the secure data provisioning component 110 or 210 of FIG. 1 or 2.

As shown in FIG. 3A, the method 301 may begin with the processing logic receiving a first instruction of a sequence of instructions for storing first data into a memory of a device (block 302). In some embodiments, the sequence of instructions may be signed or encrypted by a private key and the processing logic may access the sequence of instructions by verifying or decrypting the sequence of instructions by using a corresponding public key that is stored in the circuitry of the device. The processing logic may subsequently store the first data of the first instruction into the memory of the device (block 303). As further described with regard to FIG. 3B, the first data of the first instruction may correspond to an entity ID of an OEM (i.e., the OEM ID). The processing logic may subsequently receive a second instruction of the sequence of instructions for storing second data into the memory of the device (block 304). In response to receiving the second instruction, the processing logic may store the second data into the memory of the device based on the first data of the first instruction that was previously stored into the memory of the device (block 305). As further described with regard to FIG. 3B, the second data of the second instruction may correspond to a hash value of a public key which may be stored into the memory of the device based on the entity ID of the OEM of the first instruction matching or corresponding to the hash value of the public key. Subsequently, the processing logic may receive a third instruction of the sequence of instructions for storing a third data into the memory of the device (block 306). In response to receiving the third instruction, the processing logic may store the third data into the memory of the device based on the second data of the second instruction that was previously provisioned or stored into the memory of the device (block 307). As further described with regard to FIG. 3B, the third data of the third instruction may correspond to a symmetric key (i.e., the OEM key) which may be provisioned or stored into the memory of the device based on the hash value of the public key of the second instruction corresponding to the symmetric key. In some embodiments, the symmetric key of the third instruction may be received in an encrypted state from the OEM. For example, the symmetric key itself may be encrypted by a wrapping symmetric key where the wrapping symmetric key is stored in the device (e.g., the secure data provisioning component).

As such, data may be provisioned or stored into a memory of a device based on the prior data that has been provisioned or stored into the memory of the device. The data that is to be provisioned or stored into the memory of the device may be received as part of a sequence of instructions received from an OEM by an ODM for the ODM to provision or store into the memory of the device.

Figure 3B:
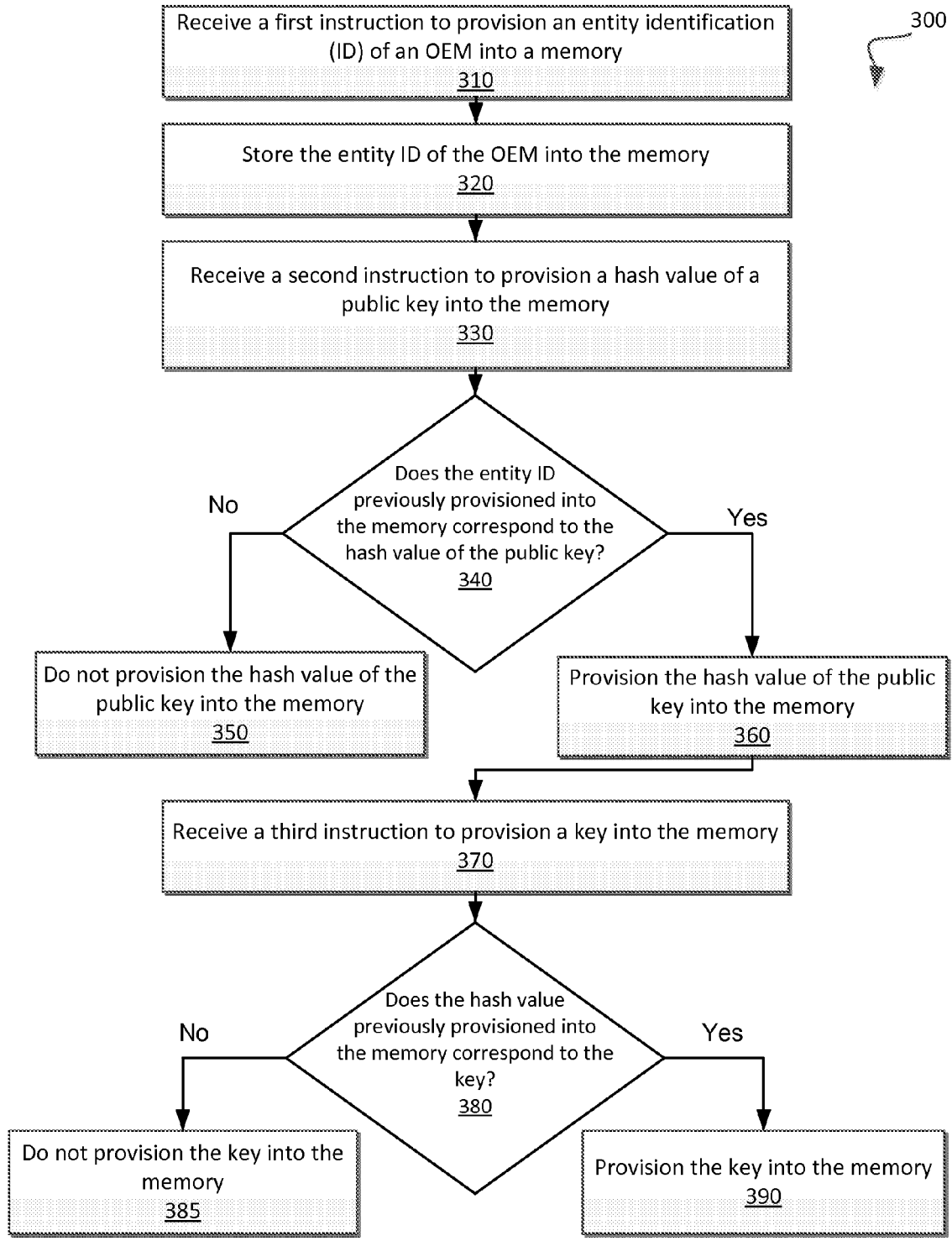
FIG. 3B is a flow diagram of an example method to provision data in a memory in accordance with some embodiments of the present disclosure.

FIG. 3B is a flow diagram of an example method 300 to provision data in a memory. In general, the method 300 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 300 may be performed by the secure data provisioning component 110 or 210 of FIG. 1 or 2.

As shown in FIG. 3B, the method 300 may begin with the processing logic receiving a first instruction to provision or store an entity identification (ID) of an OEM into a memory (block 310). The entity ID may correspond to an OEM identification. For example, a first instruction of a sequence of instructions from an OEM may be received via an ODM to store an entity ID of the OEM into an OTP memory of a device. In some embodiments, the entity ID may be unique to a particular OEM. The processing logic may store the entity ID of the OEM into the memory (block 320). Subsequently, a second instruction to provision or store a hash value corresponding to a public key into a second memory address space may be received (block 330). For example, a second instruction of the sequence of instructions from the OEM may be received for the ODM to provision or store a hash value of a public key of the OEM into the OTP memory. In some embodiments, the hash value may be calculated from a hash function that maps digital data (e.g., the public key of the OEM) to digital data of a fixed size (e.g., the hash value).

Referring to FIG. 3B, the processing logic may determine if the entity ID previously provisioned into the memory corresponds to the hash value of the public key of the second instruction (block 340). For example, a determination may be made as to whether the hash value of the public key of the second instruction of the sequence of instructions that is received by the ODM from the OEM to provision into the memory of the device is identified as belonging to or being associated with the entity ID of the first instruction of the sequence of instructions that was previously received by the ODM from the OEM and that was previously provisioned into the memory of the device. In some embodiments, the hash value of the public key of the OEM may be received from the instruction with an OEM ID check value (i.e., a checksum value that may be data that is smaller in size than the hash value of the public key and may be used to detect an error with the OEM ID). The processing device may determine if the OEM ID check value corresponds to an OEM ID value that is stored in the memory of the device. In the same or alternative embodiments, the hash value of the public key, or a portion of the hash value, may be used as the OEM ID. If the hash value of the public key does not correspond to the entity ID that was previously provisioned or stored into the memory, then the processing logic may not provision or store the hash value of the public key into the memory (block 350). For example, if the hash value of the public key from the second instruction does not belong to the entity ID of the OEM that was previously stored into the memory, then the hash value of the public key may not be stored into the memory. If the processing logic determines that the entity ID that was previously provisioned into the memory corresponds to the hash value of the public key, then the hash value of the public key may be stored into the memory (block 360). For example, if the hash value of the public key does belong to the entity ID of the OEM that was previously stored into the memory, then the hash value of the public key may be stored into the memory.

The processing logic may further receive a third instruction to provision a key into the memory (block 370). For example, a third instruction of the sequence of instructions from the OEM may be received for the ODM to provision or store a cryptographic key of the OEM (i.e., the OEM key) into the OTP memory. The third instruction may be received after the second instruction. In some embodiments, the key that is to be provisioned by the third instruction may be a symmetric key. The processing logic may determine if the hash value of the public key that was previously provisioned into the memory corresponds to the key of the third instruction (block 380). For example, a determination may be made as to whether the key of the third instruction of the sequence of instructions that is received by the ODM from the OEM is identified as being paired with the hash value of the public key that was previously provisioned into the memory (e.g., the key should be provisioned into a memory with a particular hash value of a public key). If the key of the third instruction does not correspond to the hash value of the public key that was previously stored into the memory, then the processing logic may not provision or store the key into the memory (block 385). For example, if the key from the third instruction should not be paired with the hash value of the public key that was previously stored into the memory, then the key may not be stored into the memory. If the processing logic determines that the hash value of the public key that was previously provisioned into the memory corresponds to the key, then the key may be stored into the memory (block 390). For example, if the key of the third instruction should be paired with the hash value of the public key that was previously stored into the memory, then the key may be stored into the memory.

In some embodiments, the processing logic may further verify whether the entity ID of the OEM that was previously provisioned or stored into the memory corresponds to the key before executing the third instruction to store the symmetric key into the memory. Thus, in some embodiments, the provisioning of the symmetric key from the third instruction into the memory may be based on the entity ID of the OEM from the first instruction and the hash value of the public key from the second instruction.

FIGS. 4A-4D are block diagrams of an example provisioning of data into a memory of a device. In general, the example provisioning of data may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the example provisioning may be performed by the secure data provisioning component 110 or 210 of FIG. 1 or 2.

Figure 4A:
FIGS. 4A-4D are block diagrams of an example provisioning of data into a memory of a device in accordance with some embodiments.
Figure 4B:
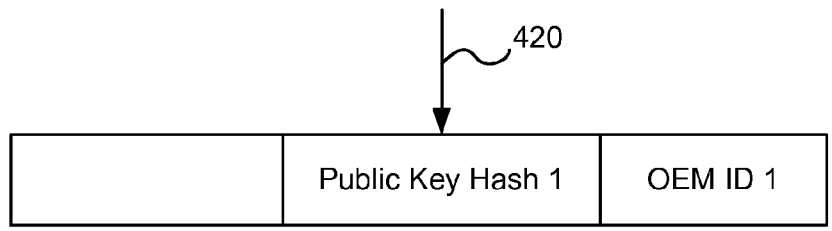
Figure 4C:
Figure 4D:
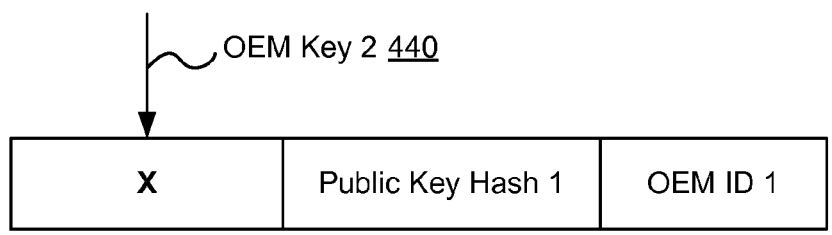

As shown in FIG. 4A, a first instruction 410 of a sequence of instructions may be received to provision or store an entity ID of an OEM into the memory. For example, an entity ID of 'OEM ID 1' may be provisioned into the memory. Subsequently, as shown in FIG. 4B, a second instruction 420 of the sequence of instructions may be received to provision or store a hash value of a public key into the memory. For example, a first public key hash value may be provisioned or stored into the memory based on the first public key hash value corresponding to a first OEM with an entity ID of 'OEM ID 1.' Furthermore, as shown in FIG. 4C, a third instruction 430 of the sequence of instructions may be received to provision or store a symmetric key into the memory. For example, a symmetric key 'OEM Key 1' may be provisioned or stored into the memory based on the symmetric key corresponding to the first public key hash value for the first OEM. However, as shown in FIG. 4D, another instruction 440 may be received to provision or store a symmetric key 'OEM Key 2' for a second OEM that is different than the first OEM with the entity ID of 'OEM ID 1.' Since the 'OEM Key 2' does not correspond to the public key hash value of the first OEM that is already stored into the memory, the symmetric key 'OEM Key 2' may not be provisioned or stored into the memory.

Figure 5:
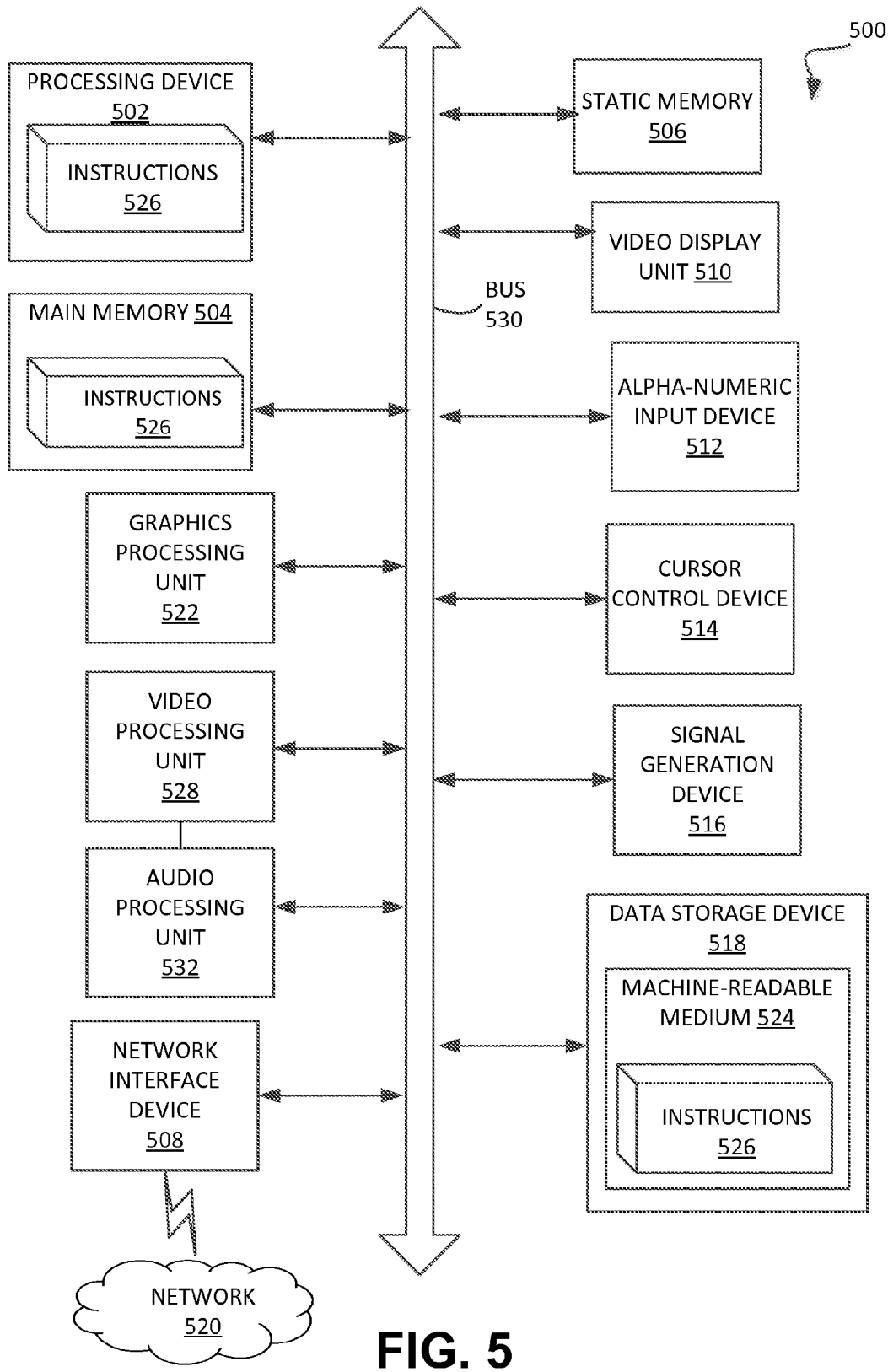
FIG. 5 illustrates a block diagram of an embodiment of a computer system in which some embodiments of the disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 1100 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality corresponding to an encrypted key deriver (e.g., secure data provisioning component 110 or 210 of FIG. 1 or 2). While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
receiving, by an integrated circuit of a device, a first instruction to store an entity identification (ID) in a memory of the integrated circuit, wherein the entity ID is unique to a particular manufacturer, and wherein the integrated circuit comprises a secure data provisioning component;
storing the entity ID in the memory of the device in response to receiving the first instruction;
receiving, by the integrated circuit, a second instruction to store a hash value of a public key in the memory of the device, wherein the second instruction comprises the hash value and an ID check value, wherein the ID check value is used by the secure data provisioning component to detect an error with the entity ID prior to storing the hash value in the memory of the device, wherein the public key corresponds to a private key used by the particular manufacturer to sign software that is loaded on the device;
prior to storing the hash value in the memory of the device, determining, by the secure data provisioning component, whether the hash value to be stored in the memory corresponds to the entity ID that is stored in the memory using the ID check value, wherein the hash value corresponds to the entity ID when the ID check value matches the entity ID stored in the memory;
storing the hash value in the memory of the device when the hash value is determined to correspond to the entity ID by the secure data provisioning component; and preventing, by the secure data provisioning component, the storing of the hash value when the ID check value does not match the entity ID stored in the memory.

2. The method of claim 1, further comprising:
receiving, by the secure data provisioning component, a third instruction to store a symmetric key in the memory of the device, wherein the third instruction comprises the symmetric key and an expected value, wherein the expected value is used by the secure data provisioning component to detect an error with the hash value prior to storing the symmetric key in the memory of the device, wherein the symmetric key is specified by the particular manufacturer to authenticate the device during a later operation of the device;
prior to storing the symmetric key in the memory of the device, determining, by the secure data provisioning component, whether the symmetric key to be stored in the memory corresponds to the hash value that is stored in the memory using the expected value, wherein the symmetric key corresponds to the hash value when the expected value matches the hash value stored in the memory; and
storing the symmetric key in the memory of the device when the symmetric key is determined to correspond to the hash value.

3. The method of claim 2, wherein the first instruction, the second instruction, and the third instruction are associated with a sequence of instructions received from an original equipment manufacturer (OEM) by an original device manufacturer (ODM) via a network.

4. The method of claim 3, wherein the sequence of instructions is associated with a signature corresponding to the private key, the method further comprising:
retrieving, from circuitry of the device, the public key corresponding to the private key; and
authenticating the signature of the sequence of instructions based on the public key.

5. The method of claim 2, wherein the symmetric key is encrypted based on a wrapping key.

6. The method of claim 5, wherein the wrapping key is stored in the device.

7. A system comprising:
a memory; and
a integrated circuit comprising a secure data provisioning component operatively coupled with the memory, the secure data provisioning component to:
receive a first instruction to store an entity identification (ID) in a memory of a device, wherein the entity ID is unique to a particular manufacturer;
store the entity ID in the memory of the device in response to receiving the first instruction;
receive a second instruction to store a hash value of a public key in the memory of the device, wherein the second instruction comprises the hash value and an ID check value, wherein the ID check value is used by the secure data provisioning component to detect an error with the entity ID prior to storing the hash value in the memory of the device, wherein the public key corresponds to a private key used by the particular manufacturer to sign software that is loaded on the device;
prior to storing the hash value in the memory of the device, determine whether the hash value to be stored in the memory corresponds to the entity ID that is stored in the memory using the ID check value, wherein the hash value corresponds to the entity ID when the ID check value corresponds to the entity ID stored in the memory; and
store the hash value in the memory of the device when the hash value is determined to correspond to the entity ID.

8. The system of claim 7, wherein the secure data provisioning component is further to:
receive a third instruction to store a symmetric key in the memory of the device, wherein the third instruction comprises the symmetric key and an expected value, wherein the expected value is used by the secure data provisioning component to detect an error with the hash value prior to storing the symmetric key in the memory of the device, wherein the symmetric key is specified by the particular manufacturer to authenticate the device during a later operation of the device;
prior to storing the symmetric key in the memory of the device, determining, by the secure data provisioning component, determine whether the symmetric key to be stored in the memory corresponds to the hash value that is stored in the memory using the expected value, wherein the symmetric key corresponds to the hash value when the expected value matches the hash value stored in the memory; and
store the symmetric key in the memory of the device when the symmetric key is determined to correspond to the hash value.

9. The system of claim 8, wherein the first instruction, the second instruction, and the third instruction are associated with a sequence of instructions received from an original equipment manufacturer (OEM) by an original device manufacturer (ODM) via a network.

10. The system of claim 9, wherein the sequence of instructions is associated with a signature corresponding to the private key, the secure data provisioning component is further to:
retrieve, from circuitry of the device, the public key corresponding to the private key; and
authenticate the signature of the sequence of instructions based on the public key.

11. The system of claim 8, wherein the symmetric key is encrypted based on a wrapping key.

12. The system of claim 11, wherein the wrapping key is stored in the device.

13. A non-transitory computer readable medium including data that, when accessed by a secure data provisioning component of an integrated circuit of a device, cause the secure data provisioning component to perform operations comprising:
receiving a first instruction to store an entity identification (ID) in a memory of the device, wherein the entity ID is unique to a particular manufacturer;
storing the entity ID in the memory of the device in response to receiving the first instruction;
receiving a second instruction to store a hash value of a public key in the memory of the device, wherein the second instruction comprises the hash value and an ID check value, wherein the ID check value is used by the secure data provisioning component to detect an error with the entity ID prior to storing the hash value in the memory of the device, wherein the public key corresponds to a private key used by the particular manufacturer to sign software that is loaded on the device;
prior to storing the hash value in the memory of the device, determining whether the hash value to be stored in the memory corresponds to the entity ID that is stored in the memory using the ID check value, wherein the hash value corresponds to the entity ID when the ID check value corresponds to the entity ID stored in the memory; and storing the hash value in the memory of the device when the hash value is determined to correspond to the entity ID by the secure data provisioning component.

14. The non-transitory computer readable medium of claim 13, the operations further comprising:

receiving a third instruction to store a symmetric key in the memory of the device, wherein the third instruction comprises the symmetric key and an expected value, wherein the expected value is used by the secure data provisioning component to detect an error with the hash value prior to storing the symmetric key in the memory of the device, wherein the symmetric key is specified by the particular manufacturer to authenticate the device during a later operation of the device;

prior to storing the symmetric key in the memory of the device, determining whether the symmetric key to be stored in the memory corresponds to the hash value that is stored in the memory using the expected value, wherein the symmetric key corresponds to the hash value when the expected value matches the hash value stored in the memory; and storing the symmetric key in the memory of the device when the symmetric key is determined to correspond to the hash value.

15. The non-transitory computer readable medium of claim 14, wherein the first instruction, the second instruction, and the third instruction are associated with a sequence of instructions received from an original equipment manufacturer (OEM) by an original device manufacturer (ODM) via a network.

16. The non-transitory computer readable medium of claim 15, wherein the sequence of instructions is associated with a signature corresponding to the private key, the operations further comprising:

retrieving, from circuitry of the device, the public key corresponding to the private key; and authenticating the signature of the sequence of instructions based on the public key.

17. The non-transitory computer readable medium of claim 14, wherein the symmetric key is encrypted based on a wrapping key, and wherein the wrapping key is further stored in the device.

* * * * *